United States Patent
Nguyen et al.

(10) Patent No.: US 10,832,181 B2
(45) Date of Patent: Nov. 10, 2020

(54) MANAGEMENT OF BUSINESS PROCESS KEY PERFORMANCE INDICATORS

(75) Inventors: Kiet Q. Nguyen, Cary, NC (US); Annapureddy S. Reddy, Morrisville, NC (US); Shubha S. Tangirala, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1330 days.

(21) Appl. No.: 12/180,955

(22) Filed: Jul. 28, 2008

(65) Prior Publication Data
US 2010/0023362 A1     Jan. 28, 2010

(51) Int. Cl.
*G06Q 10/06* (2012.01)

(52) U.S. Cl.
CPC ....... *G06Q 10/06* (2013.01); *G06Q 10/06393* (2013.01)

(58) Field of Classification Search
CPC .......................... G06Q 10/06393; G06Q 10/06
USPC ................................................ 705/7.11, 7.39
See application file for complete search history.

(56) References Cited

U.S. PATENT DOCUMENTS

| | | | | |
|---|---|---|---|---|
| 5,548,539 | A * | 8/1996 | Vlach et al. | 703/6 |
| 6,790,045 | B1 * | 9/2004 | Drimmer | G09B 7/00 434/336 |
| 7,716,253 | B2 * | 5/2010 | Netz et al. | 707/803 |
| 8,160,917 | B1 * | 4/2012 | Solanki | G06Q 10/0637 705/7.31 |
| 8,200,527 | B1 * | 6/2012 | Thompson | G06Q 10/0639 705/7.38 |
| 10,531,325 | B2 * | 1/2020 | Serrano Garcia | H04W 24/08 |
| 2002/0099598 | A1 * | 7/2002 | Eicher, Jr. | G06Q 10/06 705/28 |
| 2002/0165757 | A1 * | 11/2002 | Lisser | 705/10 |
| 2003/0069773 | A1 * | 4/2003 | Hladik et al. | 705/7 |
| 2003/0149578 | A1 * | 8/2003 | Wong | G06Q 10/06312 705/7.22 |

(Continued)

OTHER PUBLICATIONS

Lipe, Marlys Gascho; Salterio, Steven E. "The Balanced Scorecard: Judgemental Effects of Common and Unique Performance Measures". Jul. 2000. The Accounting Review. vol. 75, Issue 3. pp. 283-298.*

(Continued)

*Primary Examiner* — Timothy Padot
*Assistant Examiner* — Darlene Garcia-Guerra
(74) *Attorney, Agent, or Firm* — Christopher M. Pignato (57) ABSTRACT

A method for managing key performance indicators (KPIs) in an enterprise business having a plurality of business units can be provided. The method can include receiving a target for a general KPI and at least one constraint for a general attribute, wherein the general KPI is an aggregation of KPIs and wherein the general attribute is an aggregation of attributes. The method can further include reading a formula for each of the business units, wherein a formula defines how changes in a KPI are correlated with changes in the unit's attribute. The method can further include calculating for each business unit a separate target for the KPI of the business unit such that: a) the general attribute remains within the at least one constraint and b) the target for the general KPI is attained and sending to each business unit a separate target that was calculated.

3 Claims, 4 Drawing Sheets

(56) References Cited

U.S. PATENT DOCUMENTS

| | | | |
|---|---|---|---|
| 2004/0098358 A1* | 5/2004 | Roediger | G06N 5/00 706/46 |
| 2004/0102982 A1* | 5/2004 | Reid | G06Q 10/06393 705/7.39 |
| 2004/0199416 A1* | 10/2004 | Heina et al. | 705/10 |
| 2005/0091102 A1* | 4/2005 | Retsina | 705/10 |
| 2005/0143953 A1* | 6/2005 | Retsina | 702/182 |
| 2005/0154635 A1* | 7/2005 | Wright et al. | 705/11 |
| 2005/0216831 A1* | 9/2005 | Guzik | G06Q 10/06 715/255 |
| 2006/0010164 A1* | 1/2006 | Netz | G06Q 10/06 |
| 2006/0069863 A1* | 3/2006 | Palmer | G06F 3/0605 711/114 |
| 2006/0115824 A1* | 6/2006 | Samadpour | C12Q 1/04 435/6.12 |
| 2006/0161471 A1* | 7/2006 | Hulen et al. | 705/10 |
| 2006/0168475 A1* | 7/2006 | Segers | G06F 11/0733 714/25 |
| 2007/0239573 A1* | 10/2007 | Tien et al. | 705/35 |
| 2007/0282692 A1* | 12/2007 | Bishop | G06Q 10/06 705/26.1 |
| 2008/0065470 A1* | 3/2008 | Nelmes et al. | 705/10 |
| 2008/0178148 A1* | 7/2008 | Enyeart | G06Q 40/00 717/109 |
| 2008/0243912 A1* | 10/2008 | Azvine et al. | 707/103 R |
| 2008/0270363 A1* | 10/2008 | Hunt | G06F 16/2462 |
| 2008/0294471 A1* | 11/2008 | Gupta | G06Q 10/06393 705/7.39 |
| 2009/0037241 A1* | 2/2009 | Olsen et al. | 705/7 |
| 2009/0075655 A1* | 3/2009 | Dobson | H04W 24/08 455/436 |
| 2009/0132304 A1* | 5/2009 | Krause | G06Q 10/06393 705/7.39 |
| 2009/0245115 A1* | 10/2009 | Krishnaswamy | H04L 41/5025 370/242 |
| 2009/0292583 A1* | 11/2009 | Eilam | G06Q 10/06 705/7.31 |
| 2010/0077077 A1* | 3/2010 | Devitt | H04L 41/147 709/224 |

OTHER PUBLICATIONS

RuleBAM: A Rule-Based Framework for Business Activity Management JJ Jeng, David Flaxer, Shubir Kapoor. T.J. Watson Research Center, Proceedings of the 2004 IEEE International Conference on Services Computing (SCC'04) 0-7695-2225-4/04 (Year: 2004).*

* cited by examiner

MANAGEMENT OF BUSINESS PROCESS KEY PERFORMANCE INDICATORS

BACKGROUND OF THE INVENTION

Field of the Invention

The present invention relates to the field of business process management and more particularly to software that facilitates business activity monitoring.

Description of the Related Art

A business process is a collection of related, structured activities that produce a service or product that meet the needs of a client. Business processes are critical to a business organization as they generate revenue and often represent a significant proportion of costs. Business process management (BPM) is a method of efficiently organizing and managing a business organization so as to meet its business objectives. BPM promotes business effectiveness, efficiency, innovation, flexibility and integration with technology. BPM further attempts to continuously improve business processes. Business process optimization includes retrieving process performance information, identifying potential or actual bottlenecks, cost savings or other improvements and then applying those improvements in the design of the business process through BPM.

Business Activity Monitoring (BAM) is software that aids in monitoring of business processes, as those processes are implemented in computer systems. BAM refers to the aggregation, analysis, and presentation of real time information about business processes inside organizations and involving customers and partners. BAM is an enterprise solution primarily intended to provide a real-time summary of business processes to operations managers and upper management. The main benefits of BAM are to enable an enterprise to make better informed business decisions, quickly address problem areas, and re-position organizations to take full advantage of emerging opportunities.

One feature of BAM solutions is the presentation of information on dashboards that contain key performance indicators (KPIs) used to provide assurance and visibility of business activity and performance. This information is used by to provide visibility, measurement, and assurance of key business processes as well as detecting and warning of impending problems. BAM systems usually use a computer dashboard display to present data processed in real-time and pushed to the dashboard.

Line of Business (LOB) refers to a set of one or more highly related products or services which service a particular customer transaction or business need. In a complex business enterprise involving hundreds of business units, it can be difficult for a LOB manager or executive to raise corporate or overall KPI targets without first knowing how it will impact the individual business units. It is instructive to know if the respective business units will be able to meet the new KPI targets without incurring unexpected cost and that they will do so in the expected time. Conventional BPM tools and dashboards do not provide an adequate way to achieve this objective. The typical LOB manager or executive must rely on dashboards to keep track of KPI targets and rely on separate Enterprise Resource Planning (ERP) applications to receive reports on the impact a higher KPI target may have on business performance of individual business units. In addition, a separate application or technology is often used to communicate the desired business goals or KPI target levels to individual business units. This conventional system of disparate technologies to achieve a single goal can be time-consuming and difficult to use.

In one example, an electronics retail chain may contain multiple individual business units or stores in the country. The business process model for this business may have a top level "Corporate Sales KPI" that is calculated using an expression or formula that aggregates several KPIs from each of the individual retail stores. At the top or corporate level, an LOB executive may decide to raise the target for the "Corporate Sales KPI" by 5% by a certain date and uses the business dashboard to do so. Today, this corporate decision does not get propagated seamlessly to individual stores using BPM applications; rather, the decision is conveyed to the individual stores via other, separate ERP tools (not connected with BPM applications) or conventional communications means, resulting in all store managers increasing their KPI targets by 5% using business dashboards. This is not the most efficient way to achieve corporate goals since each individual store's cost to increase sales and each store's response time is different. Specifically, each store holds a set of parameters which impact its KPI performance. For example, it may cost less to demand a higher sales performance from store A than compared to store B, even though store B responds much faster to raised KPI targets.

Therefore, there is a need to overcome the deficiencies with the prior art and more particularly for a more efficient way to disseminate general or corporate KPI targets to each individual business unit in an enterprise business.

Furthermore, when business performance falls below expected targets, some KPIs reflect this fact on a business dashboard used to monitor the business process. Business managers typically react to this situation and take corrective action. This corrective action could range from researching the problem manually, using ERP systems, making phone calls, meeting with people, electronic communications with business partners, etc. As there can be numerous KPIs involved in a complex business process, the corrective action process must be repeated each time a KPI deviates from its assigned targets. Over a period of time, one single KPI might be corrected by different methods and tactics. Moreover, the business management personnel might change. Since conventional business dashboards do not keep track of deviating KPIs and the corrective actions previously taken, business process managers typically lose precious time and resources determining how to correct KPI performance, even though they themselves or someone else may have previously corrected KPI performance in the same or similar situation.

Therefore, there is a need to overcome the deficiencies with the prior art and more particularly for a more efficient way to log corrective actions taken to increase KPI performance, and so as to provide a knowledge base for corrective actions taken in the future.

BRIEF SUMMARY OF THE INVENTION

Embodiments of the present invention address deficiencies of the art in respect to business process management and provide a novel and non-obvious methods and computer program products for facilitating management of key performance indicators. In an embodiment of the invention, a method for managing key performance indicators (KPIs) in an enterprise business having a plurality of business units can be provided. The method can include receiving a target for a general KPI and at least one constraint for a general attribute, wherein the general KPI is calculated based on an aggregation of corresponding KPIs in all business units and wherein the general attribute is calculated based on an aggregation of corresponding attributes in all business units. The method can further include reading a separate formula for each of the business units, wherein a formula defines how changes in the KPI for a business unit are correlated with changes in the attribute for the business unit. The method can further include calculating for each business unit a separate target for the KPI of the business unit such that: a) the general attribute remains within the at least one constraint and b) the target for the general KPI is attained and sending to each business unit a separate target that was calculated.

In another embodiment of the invention, a computer program product comprising a computer usable medium embodying computer usable program code for managing key performance indicators (KPIs) in an enterprise business having a plurality of business units can be provided. The computer program product can include computer usable program code for receiving a target for a general KPI and at least one constraint for a general attribute, wherein the general KPI is calculated based on an aggregation of corresponding KPIs in all business units and wherein the general attribute is calculated based on an aggregation of corresponding attributes in all business units. The computer program product can further include computer usable program code for reading a separate formula for each of the business units, wherein a formula defines how changes in the KPI for a business unit are correlated with changes in the attribute for the business unit. The computer program product can further include computer usable program code for calculating for each business unit a separate target for the KPI of the business unit such that: a) the general attribute remains within the at least one constraint and b) the target for the general KPI is attained and sending to each business unit a separate target that was calculated.

In an embodiment of the invention, an alternative method for managing key performance indicators (KPIs) in an enterprise business having a plurality of business units can be provided. The method can include detecting a first KPI below a predefined threshold and storing in a record associated with the first KPI information pertaining to trends of the first KPI and other KPIs before the first KPI fell below the predefined threshold. The method can further include receiving a corrective action intended to bring the first KPI above the predefined threshold and storing in the record associated with the first KPI information pertaining to the corrective action of the user. The method can further include detecting the first KPI below the predefined threshold and providing to the user information in the record associated with the first KPI.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to business process management and provide a novel and non-obvious methods and computer program products for facilitating management of key performance indicators. In an embodiment of the invention, a method for managing key performance indicators (KPIs) in an enterprise business having a plurality of business units can be provided. The method can include receiving a target for a general KPI and at least one constraint for a general attribute, wherein the general KPI is calculated based on an aggregation of corresponding KPIs in all business units and wherein the general attribute is calculated based on an aggregation of corresponding attributes in all business units. The method can further include reading a separate formula for each of the business units, wherein a formula defines how changes in the KPI for a business unit are correlated with changes in the attribute for the business unit. The method can further include calculating for each business unit a separate target for the KPI of the business unit such that: a) the general attribute remains within the at least one constraint and b) the target for the general KPI is attained. The method can further include sending to each business unit a separate target that was calculated.

Figure 1:
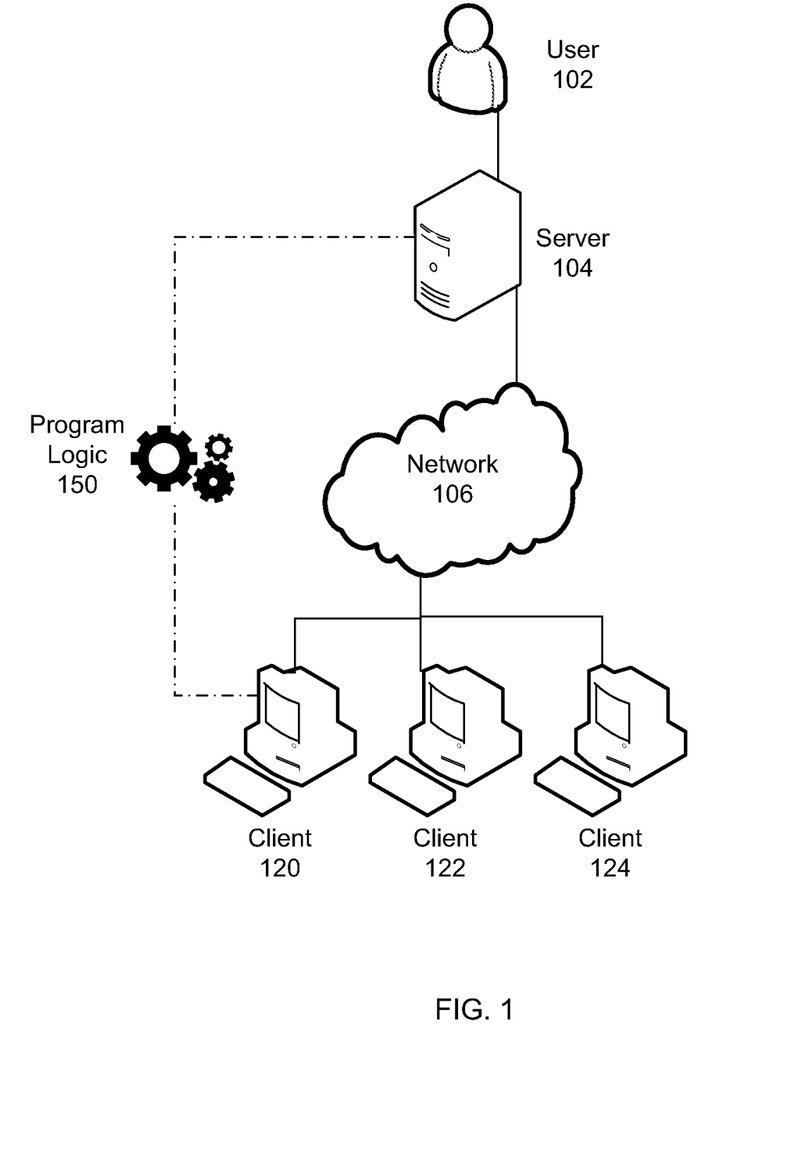
FIG. 1 is a block diagram illustrating a network architecture of a business process management system for managing KPIs in an enterprise business, in accordance with one embodiment of the present invention.

Referring now to the drawing figures in which like reference designators refer to like elements, there is shown in FIG. 1 a block diagram illustrating a network architecture of a business process management system for managing KPIs in an enterprise business, in accordance with one embodiment of the present invention. FIG. 1 shows a client-server relationship between server 104 and clients 120, 122, 124. The exemplary embodiments of the present invention adhere to the system architecture of FIG. 1. FIG. 1 shows an embodiment of the present invention wherein a business process manager, or user 102, may utilize computer or server 104 to interact with client computers 120, 122, 124 over a network 106, such as the Internet, the World Wide Web, a WAN or a LAN. User 102 may be a LOB manager or executive and each client computer 120, 122, 124 may be located at a separate individual business unit of an enterprise business managed by user 102.

Server 102 may include BPM and/or BAM software engines that deliver data and/or user functionality to client computers 120, 122, 124. The server 102 may adhere to any commercially available server platform, such as the Sun Microsystems J2EE platform, a Web-based application platform, an integrated platform for e-commerce or a content management system platform. It should be noted that although FIG. 1 shows only one server 102 and three client computers 120, 122, 124, the system of the present invention supports any number of servers and client computers connected via network 106.

FIG. 1 shows a system whereby an application, represented by program logic 150 running on a server 104, provides KPI management functionality as described in greater detail below. Program logic 150 comprises computer source code, scripting language code or interpreted language code that is compiled to produce computer instructions that perform various functions of the present invention. In one embodiment of the present invention, the program logic 150 is a scripting language such as XML, XSLT, Javascript, ECMAScript, Cascading style sheets, XUL, PHP or a related AJAX or JSP technology.

Program logic 150 may reside on server 104 or may reside in a distributed fashion on server 104 in addition to client computers 120, 122, 124 or any combination of the four. In one embodiment of the present invention, the program logic 150 is a client-server application having a client portion that resides on the computer of client computers 120, 122, 124 and a server application that resides on server 104.

In an embodiment of the present invention, the computer systems of server 104 and computers 120, 122, 124 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems of server 104 and computers 120, 122, 124 are a server system, such as IBM RS/6000 workstations and servers running the AIX operating system.

In an embodiment of the present invention, the network 106 is a circuit switched network, such as the Public Service Telephone Network (PSTN). In another embodiment, the network 106 is a packet switched network. The packet switched network is a wide area network (WAN), such as the global Internet, a private WAN, a local area network (LAN), a telecommunications network or any combination of the above-mentioned networks. In yet another embodiment, the structure of the network 106 is a wired network, a wireless network, a broadcast network or a point-to-point network.

Figure 2:
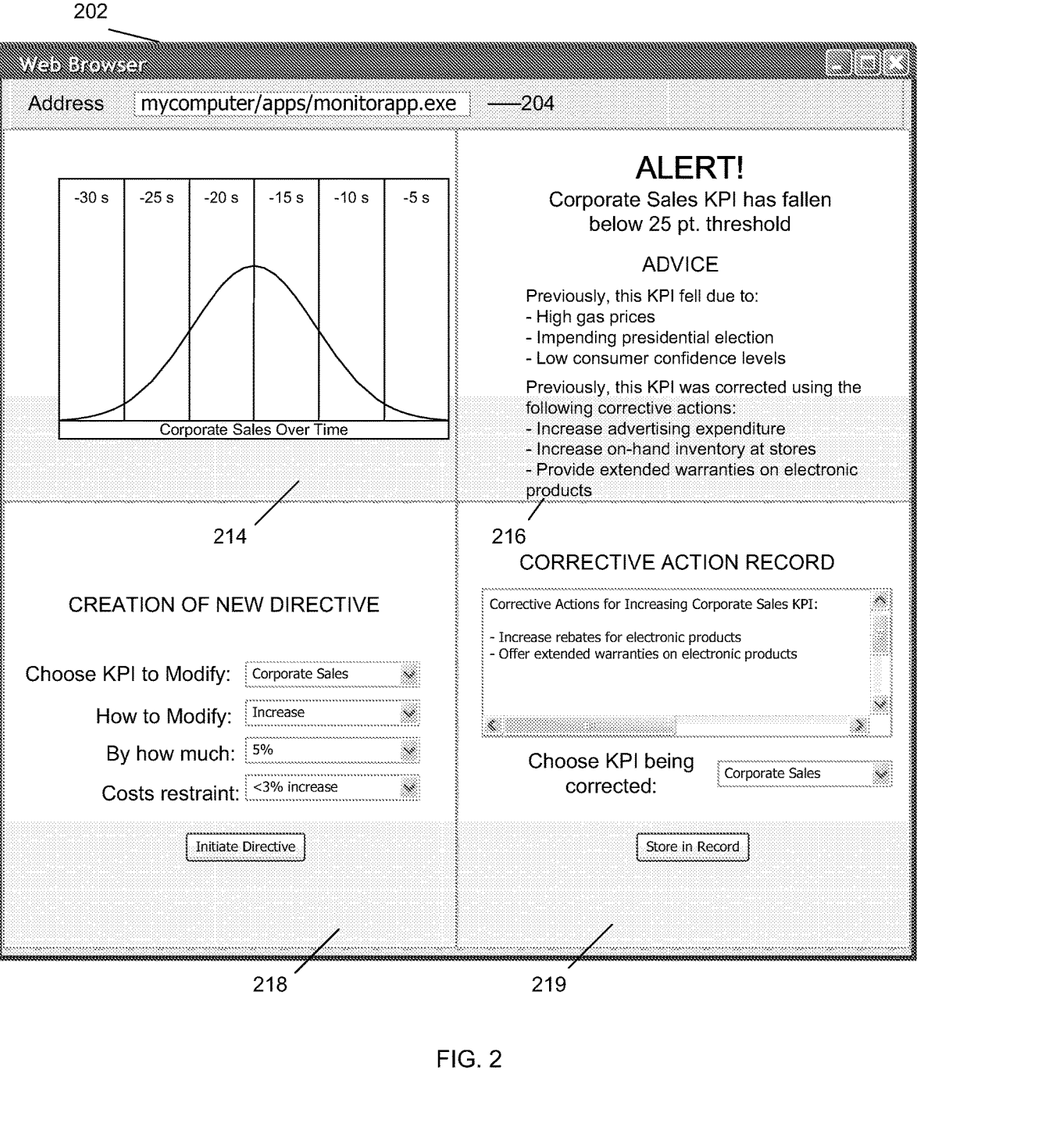
FIG. 2 is an illustration of a user interface for a business process management system for managing KPIs in an enterprise business, in accordance with one embodiment of the present invention.

FIG. 2 is an illustration of a user interface 202 for a business process management system for managing KPIs in an enterprise business, in accordance with one embodiment of the present invention. FIG. 2 shows that user interface 202 includes multiple user interface elements 214, 216, 218, 219, in accordance with one embodiment of the present invention. It should be noted that although FIG. 2 depicts one example wherein a user interface (specifically, a web browser) is used to monitor one KPI, the present invention may be directed towards the monitoring of any type of business process management data. The user interface 202 corresponds to a dashboard or mashup including multiple user interface elements, as described above. User interface elements, or widgets, refer to any element of a graphical user interface that displays and manipulates information, such as a window, a text box, a text field, a button, a drop down menu and a slider bar.

FIG. 2 shows that the user interface 202 is a conventional web browser. FIG. 2 shows that the web browser 202 includes an address text field 204 that indicates a local location of an executable file on server 104 that automatically renders widgets. User interface 202 thereby executes the executable file, which produces the graphics displayed in user interface 202, as shown in FIG. 2.

In another embodiment of the present invention, address text field 204 may indicate a Universal Resource Locator (URL) of a web site. Upon entering the appropriate URL, the web browser 202 sends a HyperText Transfer Protocol (HTTP) request for data to the appropriate web server corresponding to said URL. Subsequently, the web server sends executable data to the web browser 202. The executable data received by the web browser 202 may be HTML or may comprise some or all of the program logic 150, which may be a scripting language such as XML, XSLT, Javascript, etc. Upon receiving the executable data sent by the web server, web browser 202 executes the executable data, which produces the graphics displayed in user interface 202, as shown in FIG. 2.

As explained above, FIG. 2 shows user interface 202 including multiple user interface elements, or quadrants, 214, 216, 218, 219, which depict various types of information received from various clients, such as clients 120, 122, 124, which may be, for example, network servers available over a LAN or web sites served by web servers available over the Internet. Each user interface element 214, 216, 218, 219 may gather data from corresponding clients by sending an HTTP request to the appropriate network server or client.

User interface element 214 includes a graph that shows the value of a particular KPI, Corporate Sales, over time. In one embodiment, the Corporate Sales KPI is a KPI that is calculated based on an aggregation of Local Sales KPI values from each business unit of the corporation. For example, the Corporate Sales KPI may be calculated by taking a weighted average of all Local Sales KPI values.

User interface element 216 includes an alert that is displayed when a particular KPI (in this instance, the Corporate Sales KPI) meets a certain criteria, such as falling below a predefined threshold. User interface element 216 may also display information previously saved to a record associated with the Corporate Sales KPI. For example, the user element 216 may also display recorded information pertaining to factors that historically have lead to a decline in the Corporate Sales KPI. Or, the user element 216 may also display recorded information (or advice) pertaining to corrective actions previously taken to cure a decline in the Corporate Sales KPI.

User interface element 219 provides a way for a user to enter information to be recorded. Element 219 includes a text field for entering information pertaining to corrective actions currently taken to cure a decline in the Corporate Sales KPI. A pull down menu allows a user to select the KPI for which the stated corrective action is taken. A button is also provided to as to effectuate the storing of the stated corrective action information in the record associated with the Corporate Sales KPI.

Finally, user interface element 218 provides a way for a user to issue a new directive for a selected KPI. Element 218 includes several pull down menus for a user to choose, among other things, a KPI to modify, how to modify the selected KPI, and by how much to modify the selected KPI. Element 218 also provides a pull down menu for defining a cost restraint, indicating that the user desires to initiate a directive to modify a KPI while keeping the affect on costs below a threshold—specifically, below a 3% increase in costs. A button is also provided to as to effectuate the directive defined by the user.

Figure 3:
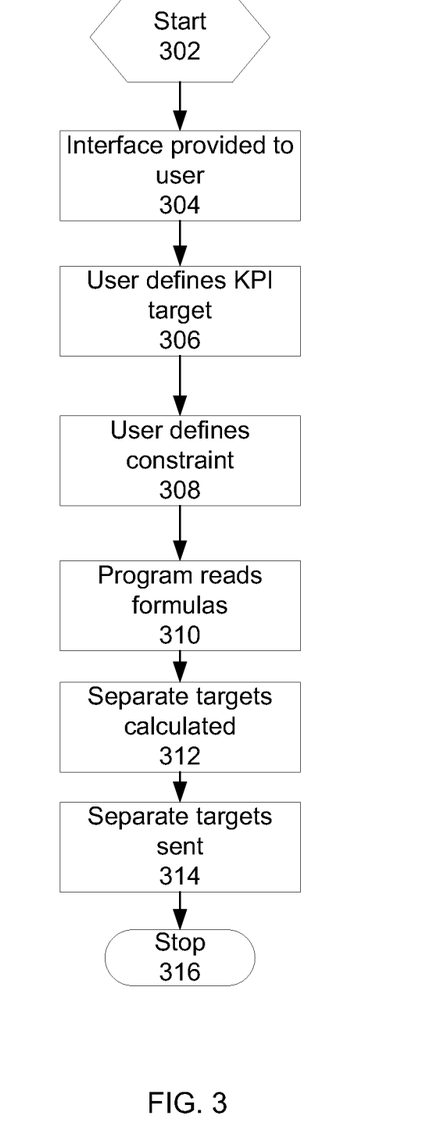
FIG. 3 is a flow chart showing the control flow of a process for disseminating a KPI target in an enterprise business, in accordance with one embodiment of the present invention.

FIG. 3 is a flow chart showing the control flow of a process for disseminating a KPI target in an enterprise business, in accordance with one embodiment of the present invention. FIG. 3 depicts the process executed by program logic 150 residing on server 104. Specifically, FIG. 3 depicts the process by which a user, manager or executive defines a directive for modifying a general or corporate KPI and the method by which the directive is disseminated to the individual business units. A web browser, such as web browser 202, may execute program logic 150. The flow chart of FIG. 3 begins with step 302 and moves directly to step 304.

In step 304, the program logic 150 provides a user interface, such as web browser 202, for a user, manager or executive to define a directive for modifying a general or corporate KPI. In step 306, the user utilizes the user interface to define a general or corporate KPI and how it should be modified. User interface element 218 may be used in step 306. For example, the user may define the Corporate Sales KPI, which is an indicator of the overall sales currently experienced by the entire corporation, wherein the Corporate Sales KPI may be calculated by taking a weighted average of all Local Sales KPI values for each individual business unit. The user may further define that he desires to increase the Corporate Sales KPI by a certain amount, such as 5%, thereby defining a target for the Corporate Sales KPI. Another example of a general or corporate KPI for a national bank includes the total number of new bank accounts opened in a given month. In response to a higher target for this corporate KPI, a target is sent to each individual business unit, which, in turn, implements new promotions to achieve the new target KPI.

In step 308, the user utilizes the user interface to define at least one constraint of a general attribute. User interface element 218 may be used in step 308. For example, the user may desire to place a constraint of a 3% maximum increase on the general costs attribute. Because costs are affected by attempts to increase sales, the user may desire to increase corporate sales only if general costs are kept below a predefined threshold, such that general costs do not overshadow gains made in corporate sales. The costs general attribute may be calculated by taking a sum of all local costs values for each individual business unit. Another example of a general attribute includes the time period necessary for effectuating a directive. In a further example, the user may desire to place a constraint of one week on the general time-period attribute, such that the general KPI target must be reached within one week.

In step 310, the program logic 150 reads a separate formula for each individual business unit, wherein a formula defines how changes in a local KPI for a business unit are correlated with changes in a local attribute for the business unit. For example, the formula may define that for every single point increase in the Local Sales KPI for a business unit, the local costs attribute increases by a single point. In another example, the formula may define that for every single point increase in the Local Sales KPI for a business unit, the time period necessary to achieve the single point is one day. Formulas for each individual business unit can be updated periodically by each business unit.

In step 312, the program logic 150 calculates for each individual business unit a separate target for the local KPI of the business unit such that: a) the general attribute remains within the defined constraint(s) and b) the general or corporate KPI target is attained. The calculation of step 312 is based on the formulas read in step 310. Because formulas may differ for each business unit, the target calculated for one business unit may be different for another business unit.

In step 313, the user 102 may view the separate targets calculated and select individual targets for propagation via the user interface 202. In step 314, the separate targets calculated for each individual business unit and selected in step 313 are transmitted to the respective business units. This communication may be done via the network 106, such as via email. The result of the communication may be the display of targets on the dashboards of clients 120, 122, 124. In step 316, the control flow of FIG. 3 ceases.

In one embodiment of the present invention, step 314 may be used to send entirely new local KPIs to each individual business unit. As a new KPI is pushed to the individual business units, the respective new KPIs will be customized so as to take into account business-unit-specific variables such as cost, response time, etc. A new KPI will be displayed on a dashboard of the business unit and necessary alerts (as predefined) may be generated.

Figure 4:
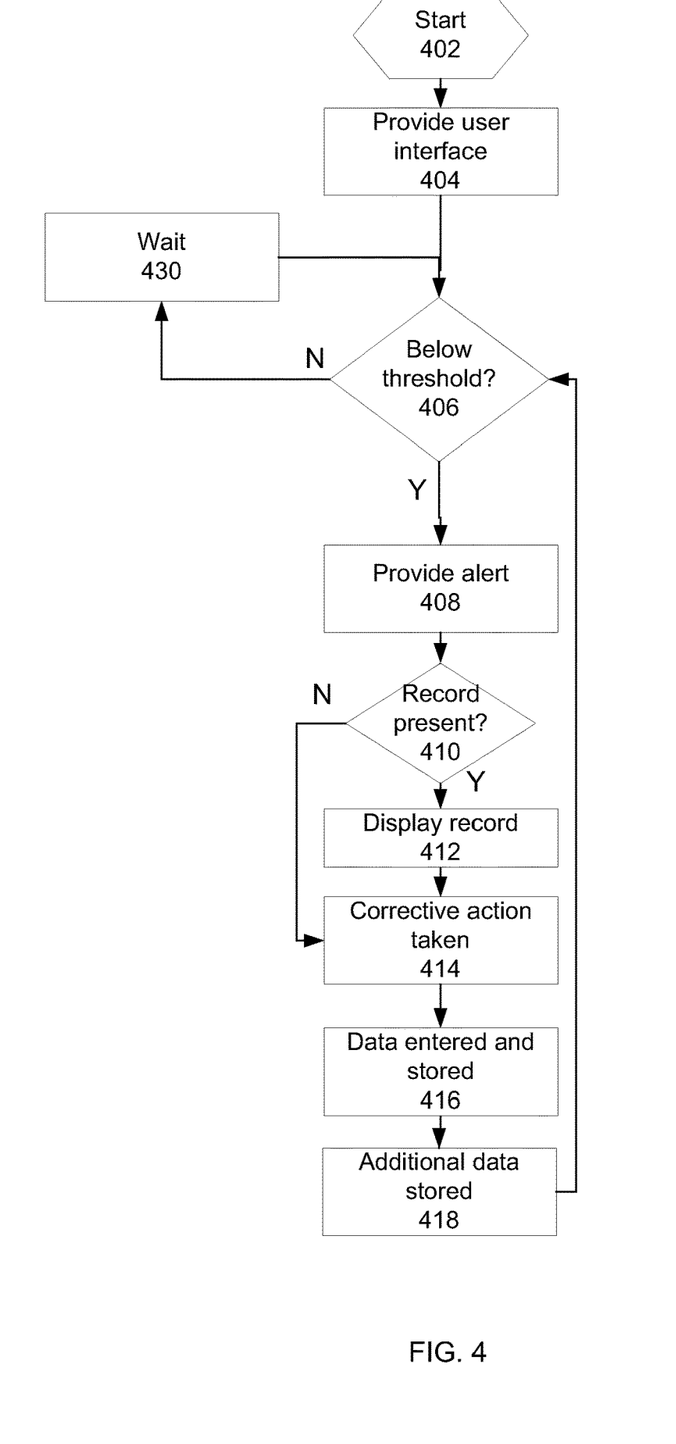
FIG. 4 is a flow chart showing the control flow of a process for managing corrective actions to aid a KPI in an enterprise business, in accordance with one embodiment of the present invention.

FIG. 4 is a flow chart showing the control flow of a process for managing corrective actions to aid a KPI in an enterprise business, in accordance with one embodiment of the present invention. FIG. 4 depicts the process executed by program logic 150 residing on server 104. Specifically, FIG. 4 depicts the process by which a user 102, manager or executive is provided with advice for modifying a general or corporate KPI based on historical data. A web browser, such as web browser 202, may execute program logic 150. The flow chart of FIG. 4 begins with step 402 and moves directly to step 404.

In step 404, the program logic 150 provides a user interface, such as web browser 202, for a user 102, manager or executive. In step 406, it is determined whether a specific general or corporate KPI, such as the Corporate Sales KPI, has fallen below a predefined threshold, such as a 25 point threshold. If the specific general or corporate KPI has fallen below a predefined threshold, then control flows to step 408 wherein, as shown in user interface element 216 of FIG. 2, the user 102 is alerted to the fact. If the specific general or corporate KPI has not fallen below a predefined threshold, then control flows to step 430 where the system waits a predefined period of time before flowing back to step 406.

In step 410, it is determined whether a record exists for the specific general or corporate KPI, such as the Corporate Sales KPI. If a record exists, then control flows to step 412 wherein, as shown in user interface element 216 of FIG. 2, various information pertaining to the particular corporate KPI is displayed. If no record exists, then control flows to step 414. In step 412, any information stored in the record associated with the corporate KPI is displayed as advice. This may include previously effectuated and stored corrective actions taken to increase the same KPI, observed trends in KPIs and other values before the KPI presently decreased and observed trends in KPIs and other values before the KPI decreased in the past. User interface element 216 of FIG. 2 shows how information stored in the record associated with the corporate KPI is displayed as advice to the user.

In step 414, the user takes a corrective action to increase the general KPI. In step 416, the user enters the corrective action he took to increase the KPI that set off the alert of step 408. This data may be entered in user interface element 219 of FIG. 2. The data entered by the user is then stored in the record associated with the general KPI, or if no record was found in step 410, then a record is created before the data entered by the user is stored.

In step 418, additional data is stored in the record associated with the general KPI. This may include trends of the general KPI before and/or after the corrective action was taken, trends of other KPIs or other business metrics before and/or after the corrective action was taken, a timestamp of when the alert of step 408 was set off, the cost and amount of time associated with bringing the general KPI back to the predefined threshold, changes detected in other KPIs while the general KPI was being restored, etc. In one embodiment of present invention, step 418 includes calculating a correlation or causal relationship between a corrective action and a change in the general KPI. In one alternative, the user 102 may select which of the data of step 418 shall be stored in the record associated with the general KPI.

As explained above, the present invention is advantageous since it allows for the centralized ability to set a general or corporate KPI target and seamlessly disseminate the corporate KPI target to individual business units while taking the formula for each business unit into account. The present invention is further advantageous as it allows a user to determine exactly how a proposed change in a local KPI will affect another attribute such as costs. Additionally, the present invention allows for the storing of corrective action and KPI data in connection with a general KPI, and then display the stored data as advice for a user 102 when the general KPI falls below a predefined threshold.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for managing key performance indicators (KPIs) in an enterprise business having a plurality of business units, comprising:

configuring a network architecture of a business process management system for managing the KPIs of the enterprise business, the network architecture comprising:
- a server including a business activity monitoring (BAM) software engine and a Web-based application platform; and
- a plurality of client devices connected to the server over a network, wherein each client device of the plurality of client devices is located at a separate business unit of the enterprise business, and the server and the plurality of client devices communicate over the Web-based application platform by sending hypertext transfer protocol (HTTP) requests between the server and each client device;

displaying in a web browser, by the server, a user interface by sending an HTTP request to a universal resource locator (URL) of a web server, receiving executable data from the web server and executing, by the web browser, the executable data to produce graphics displayed by the user interface, wherein the graphics displayed by the user interface comprises:
- a first user interface element comprising a graph showing values of a key performance indicator (KPI), wherein the KPI is calculated by taking a weighted average of all local KPI values provided by each separate business unit of the enterprise business;
- a second user interface element comprising an alert displayed by the user interface when the KPI falls below a threshold value and further displays corrective actions previously taken to cure declines in the KPI, wherein displaying the corrective actions previously taken comprises:
  - storing in a database a multiplicity of different records, each of the records including information defining both the corrective actions previously taken and also a corresponding different deficiently performing KPI;
  - determining the threshold value for each KPI in the database;
  - receiving from over the network, a measured value for the KPI in the database that is determined to fall below a corresponding threshold value and responsive to determining that the measured value falls below the corresponding threshold value:
    - locating in the database a record associated with the KPI identified as a deficiently performing KPI,
    - retrieving from the located database record, associated information defining previously effectuated and stored corrective actions taken to increase the deficiently performing KPI, and observed trends in the KPI before the KPI decreased in the past, and
    - displaying the associated information defining previously effectuated and stored corrective actions as the previously taken corrective actions, as part of the second user interface element of the user interface;
- a third user interface element comprising a pull down menu configured to select the KPI, and a text field to enter information pertaining to corrective actions taken to cure a decline in the KPI below the threshold value and a button to effectuate storing to the record, corrective action information entered into the text field; and a fourth user interface element configured to issue new directives for the KPI, wherein the fourth user interface element comprises pull down menus to select the KPI to modify, how to modify the KPI being selected, how much to modify the KPI being selected, a cost restraint indicating a directive to modify the KPI while keeping an affect on costs below a cost threshold and a time period necessary for effectuating the new directives.

2. A computer program product for managing key performance indicators (KPIs) in an enterprise business having a plurality of business units, the computer program product comprising a computer readable storage medium having program instructions embodied therewith, wherein the computer readable storage medium is not a transitory signal per se, the program instructions executable by a device to cause the device to perform a method comprising:

configuring a network architecture of a business process management system for managing the KPIs of the enterprise business, the network architecture comprising:

a server including a business activity monitoring (BAM) software engine and a Web based application platform; and a plurality of client devices connected to the server over a network, wherein each client device of the plurality of client devices is located at a separate business unit of the enterprise business, and the server and the plurality of client devices communicate over the Web-based application platform by sending hypertext transfer protocol (HTTP) requests between the server and each client device;

displaying in a web browser, by the server, a user interface by sending an HTTP request to a universal resource locator (URL) of a web server, receiving executable data from the web server and executing, by the web browser, the executable data to produce graphics displayed by the user interface, wherein the graphics displayed by the user interface comprises:

a first user interface element comprising a graph showing values of a key performance indicator (KPI), wherein the KPI is calculated by taking a weighted average of all local KPI values provided by each separate business unit of the enterprise business;

a second user interface element comprising an alert displayed by the user interface when the KPI falls below a threshold value and further displays corrective actions previously taken to cure declines in the KPI, wherein displaying the corrective actions previously taken comprises:

storing in a database a multiplicity of different records, each of the records including information defining both corrective actions previously taken and also a corresponding different deficiently performing KPI;

determining the threshold value for each KPI in the database;

receiving from over the network, a measured value for the KPI in the database that is determined to fall below a corresponding threshold value and responsive to determining that the measured value falls below the corresponding threshold value:

locating in the database a record associated with the KPI identified as a deficiently performing KPI, retrieving from the located database record, associated information defining previously effectuated and stored corrective actions taken to increase the deficiently performing KPI, and observed trends in the KPI before the KPI decreased in the past, and displaying the associated information defining previously effectuated and stored corrective actions as part of the second user interface element of the user interface;

a third user interface element comprising a pull down menu configured to select the KPI, and a text field to enter information pertaining to corrective actions taken to cure a decline in the KPI below the threshold and a button to effectuate storing to the record, corrective action information entered into the text field; and a fourth user interface element configured to issue new directives for the KPI, wherein the fourth user interface element comprises pull down menus to select the KPI to modify, how to modify the KPI being selected, how much to modify the KPI being selected, a cost restraint indicating a directive to modify the KPI while keeping an affect on costs below a cost threshold and a time period necessary for effectuating the new directives.

3. A data processing system configured managing key performance indicators (KPIs) in an enterprise business having a plurality of business units, the system comprising:

a host computing system comprising one or more computers each with memory and at least one processor and a database;

a plurality of client devices connected to the host computing system, wherein each client device of the plurality of client devices is located at a separate business unit of the enterprise business, and the host computing system and the plurality of client devices communicate over a Web-based application platform by sending hypertext transfer protocol (HTTP) requests between the server and each client device; and a KPI management module comprising program code enabled upon execution in the memory of the host computing system to:

display, in a web browser, a user interface by sending an HTTP request to a universal resource locator (URL) of a web server, receiving executable data from the web server and executing, by the web browser, the executable data to produce graphics displayed by the user interface, wherein the graphics displayed by the user interface comprises:

a first user interface element comprising a graph showing values of a key performance indicator (KPI), wherein the KPI is calculated by taking a weighted average of all local KPI values provided by each separate business unit of the enterprise business;

a second user interface element comprising an alert displayed by the user interface when the KPI falls below a threshold value and further displays corrective actions previously taken to cure declines in the KPI, wherein displaying the corrective actions previously taken comprises:

store in a database a multiplicity of different records, each of the records including information defining both the corrective action previously taken and also a corresponding different deficiently performing key performance indicator (KPI);

determine the threshold value for each KIP in the database;

receiving from over a the network, a measured value for the KPI in the database that is determined to fall below a corresponding threshold value and responsive to the determination that the measured value falls below the corresponding threshold value:

locate in the database a record associated with the KPI identified as a deficiently performing KPI, retrieve from the located database record, associated information defining previously effectuated and stored corrective actions taken to increase the deficiently performing KPI, and observed trends in the KPI before the KPI decreased in the past, and display the associated information defining previously effectuated and stored corrective actions as the previously taken corrective actions, as part of the second user interface element of the user interface;

a third user interface element comprising a pull down menu configured to select the KPI, and a text field to enter information pertaining to corrective actions taken to cure a decline in the KPI below the threshold value and a button to effectuate storing to the record, corrective action information entered into the text field; and a fourth user interface element configured to issue new directives for the KPI, wherein the fourth user interface element comprises pull down menus to select the KPI to modify, how to modify the KPI being selected, how much to modify the KPI being selected, a cost restraint indicating a directive to modify the KPI while keeping an affect on costs below a cost threshold and a time period necessary for effectuating the new directives.

* * * * *